United States Patent
Khanna et al.

(10) Patent No.: US 6,937,960 B2
(45) Date of Patent: Aug. 30, 2005

(54) SMOOTH CONTOURING SOFTWARE FOR GENERATING GEOPHYSICAL DATA HAVING LESS ARTIFACTS

(75) Inventors: Ramesh Khanna, Hyderabad (IN); Naresh Kumar Thakur, Hyderabad (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 10/395,385

(22) Filed: Mar. 25, 2003

(65) Prior Publication Data

US 2004/0019455 A1 Jan. 29, 2004

Related U.S. Application Data

(60) Provisional application No. 60/367,279, filed on Mar. 26, 2002.

(51) Int. Cl.[7] .......................... G01B 11/24; G01B 13/16; G01B 15/04; G01B 17/06; G01B 21/20
(52) U.S. Cl. ........................................ 702/167
(58) Field of Search .................. 702/2, 5, 16, 119, 702/120, 122, 123, 155, 167; 717/104, 105; 703/5

(56) References Cited

U.S. PATENT DOCUMENTS

| | | | | | |
|---|---|---|---|---|---|
| 5,315,375 | A | * | 5/1994 | Allen | .......................... 356/417 |
| 6,199,016 | B1 | * | 3/2001 | Zuykov | ........................ 702/16 |
| 6,615,139 | B1 | * | 9/2003 | Chakravarthi | .................. 702/2 |

* cited by examiner

*Primary Examiner*—Michael Nghiem
(74) *Attorney, Agent, or Firm*—Oliff & Berridge, PLC

(57) ABSTRACT

Smooth contouring of geophysical data is generated by USGS smooth contouring and plotting system of geophysical data having less artifacts, based on Surfer compatible minimum curvature program. A system and a method are provided, which converts the gridded file generated by USGS package to an ASCII file and the headers of files are removed. Blanks in the gridded USGS files are substituted by value compatible to SURFER software and the headers of SURFER are incorporated. With these changes the contour plots are smooth and can be run from any available personal computer.

18 Claims, 5 Drawing Sheets

SMOOTH CONTOURING SOFTWARE FOR GENERATING GEOPHYSICAL DATA HAVING LESS ARTIFACTS

FIELD OF INVENTION

The present invention relates to a method and a system for generating smooth contours of geophysical data generated by USGS smooth contouring and plotting system with less artifacts, based on Surfer compatible minimum curvature program.

BACKGROUND OF THE INVENTION

Geo-potential methods have been primarily used to delineate the sub-surface configuration and determine the magmatic and tectonic activity of the earth. These measurements are forerunners to other geophysical methods to provide the first hand information to the constituents of the earth.

Preparation of contour maps is one of the important steps in the analysis of geophysical data for interpretation of 3-dimensional causative sources. Before the advent of computers laborious hand contouring is the only way. With the invention of computers these procedures became very fast in main frame computers and through personal computers. As a result, the time and labor involved in scientific computation has drastically cut down.

The U.S. Geological Survey (USGS) began developing software for processing Potential-Field geophysical data shortly after pioneering airborne magnetic surveys in the late 1940's. Originally scientists wrote their own programmes, following their own methodology. Initially all these programs were developed in different versions and formats. In 1971 a standardized binary format for grid, line and point data was established allowing free sharing of programs developed by various scientists. The result was a pool of constantly evolving software representing a combined effort of all scientific community. Substantially costs were involved in these research and developments to make these programs error free.

Recognizing this software system to be a potentially valuable resource USGS provided the system for implementation on micro-computers which are widely available world over and provide a good medium for training and education.

Presently more than 270 programs, subprograms and subroutines are available in USGS-PF package. Although most of these programs have been in use for quite some time on various types of computers, some are new and a few of the programs have been much exercised and tested on personal computers.

MEGAPLUG subroutine replaces no-data (dval) values in a grid with values interpolated using the minimum curvature routines from program MINC. The blank areas to be filled may be of any size and shape as the program treats the existing grid data as random points. The default mode fills the entire grid and an optional mode trims the filled areas back to hulls surrounding contiguous data defined by the original grid (to fill holes within an irregular data region and leave the area outside the data region unfilled). Since the program contains the entire grid in memory, the size is limited to 50,000 grid points, but this could probably be increased somewhat.

Using MINC and running MEGAPLUG programs we can generate a grid file which gives better plots with less artifacts, but the quality of plots generated by USGS-PF package plot programs are poor in quality and can not be plotted to desired size and are basically being machine specific.

Presently many contouring and plotting packages are available in the market, 'Surfer' package developed by GOLDEN SOFTWARE, INC. USA is widely used by geo-scientists. It is a very useful package and can be used for creating XYZ data files, gridding and plotting and making various types of contour maps with lot of options.

Surfer generates grids by using various method of gridding such as inverse distance, krigging, polynomial regression, radial, minimum curvature, etc. Each method can result in different representation of data. It is advantageous to test each method with a typical data to determine the gridding method that provides the most satisfying interpretation of data.

The inverse distance to a power gridding method is weighted average interpolator and can be either an exact or a smoothing interpolator. With inverse distance the data points are weighted during interpolation such that the influence of one data point related to other decline with distance from the grid note. Weighting is assigned to data points through the use of a weighting power that controls how the weighting factors drop off as distance from the grid note increases. The greater the weighting power, the less effect points for from the grid note have during interpolation. As the power increases the grid node value approaches the value of nearest data point. For a smaller value of the weighting factor the weights are more evenly distributed among the neighboring data points. When calculating a grid node the weights assigned to the data points are fractions and the sum of the weights equal to 1.0. When an observation is coincident with the grid node the observation is given a weight 1.0, and all other observation are given a weight 0.0 One of the characteristic of inverse distance is the generation of Bull's eyes surrounding the position of observation within the gridded area. Smoothing parameters can be assigned during inverse distance to reduce the Bull's eye effect by smoothing the interpolated grid. Inverse distance is a very fast method gridding useful for smaller number of data points.

Kriging is a geo-statistical gridding method, which has been found to be very useful in many fields. Kriging attempts to express trend that are suggested in the data, so that higher valued points are connected along a ridge, rather than isolated by Bull's eye type of contours. There are several factors that are interpolated in the Kriging method: the Variogram model, the drift type and the nugget effect.

Polynomial regression is used to define large scale trends and patterns in your data.

There are several options to define the trend surface. Polynomial regression is not really a interpolator because it does not attempt to predict unknown z values.

Radial basis functions are a diverse group of data interpolation methods, in terms of ability to fit the data and to produce a smooth surface. The multi-quadratic method is considered to be the best method. All of the radial basis function methods are exact interpolators, so they make an attempt to honor the data. A smoothing factor can be introduced to all the methods in an attempt to produce a smooth surface.

Minimum curvature is widely used in earth sciences. The interpolated surface generated by the minimum curvature is analogous to a thin linearly elastic plate passing through each of the data values with a minimum of bending. Minimum curvature generates the smoothest possible surface while attempting to honor the data as closely as possible. Minimum curvature is not an exact interpolator, which means that the data is not always honored exactly.

Minimum curvature produces a grid by repeated applying an equation over the grid in attempt to smoothen the grid. Each pass over the grid is counted as one iteration. The grid node values are recalculated until successive changes in the values are less than the maximum residuals values or the maximum number of iterations is reached.

Minimum Curvature method of gridding of scattered data is one among various programs and subroutines provided by USGS-PF package. This program developed by Mike Webring, generates a 2-dimensional grid, equally incremented in x and y, from randomly placed data points. The minimum curvature algorithm produces a smooth grid by iteratively solving a set of difference equations, which minimize the total 2nd horizontal derivative and attempt to honor input data. (Briggs, 1974)

Geophysical measurements have contribution from different interfaces, which have lateral and vertical dimensions. Deviation from standard earth models is interpreted in terms of geological, physical/chemical changes in the sub-surface earth. Extensive software packages have been developed to interpret for the density and magnetic property heterogeneities in the earth in terms three dimension causative sources. However, most of the softwares have the compatibility problems, when implemented on different personal computers. The potential field contour maps generated by USGS professional software are not compatible to most of the personal computers. Apart from this the contour plots are not smooth to have meaningful interpretation in terms of the causative source.

OBJECTS OF THE PRESENT INVENTION

The main object of the present invention is to provide a method and a system for making a gridded file generated by USGS package compatible with other software packages available.

Another object of the present invention is to provide a method and a system for generating smooth contour plots from data generated by USGS package.

SUMMARY OF THE INVENTION

The present invention relates to a method and a system for generating smooth contours of geophysical data generated by USGS smooth contouring and plotting system with less artifacts, based on Surfer compatible minimum curvature program.

BRIEF DESCRIPTION OF THE ACCOMPANYING DRAWINGS

In the drawings accompanying the specification,

DETAILED DESCRIPTION OF THE INVENTION

In the regard, the present invention provides a system and a method, which converts the gridded file generated by USGS package to an ASCII file and the headers of files are removed. Blanks in the gridded USGS files are substituted by value compatible to SURFER software and the headers of SURFER are incorporated. With these changes the contour plots are smooth and can be run from any available personal computer.

The present algorithm and the system can also be modified to generate grids suitable to most of the personal computers from other programs by only replacing headers and format of the grid file by that of surfer.

The present system is primarily designed to over-come the operating limit of data in the older versions of surfer package, where the operating data limit was of the order couple of thousand points. Additionally the program can be best utilized where both the surfer and the PF package are installed on the personal computer.

A smooth grid is interpolated from random data by iteratively minimizing the sum of the second horizontal derivatives. The solution honors data when it is available, and tends to extrapolate smoothly when not available. Input data is either x, y, z, or post-file structure. x, y, z may be either ASCII or binary. Output is a grid of z values, one row per record, in standard grid format.

Figure 5:
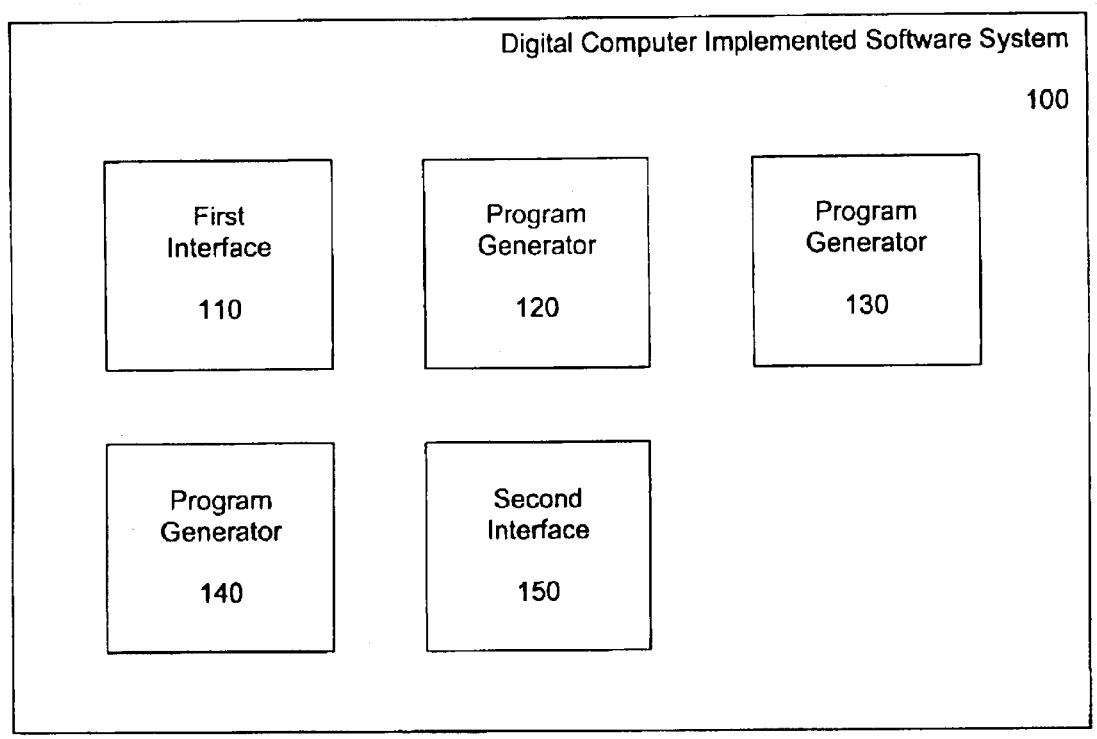
FIG. 5 is a block diagram of a digital computer implemented software system.

The present invention provides a digital computer implemented software system 100, as shown in FIG. 5, using graphical flow language for as an improved method for smooth contouring and plotting system of geophysical data having less artifacts, based on Surfer compatible minimum curvature program, the system 100 comprising:

a first interface 110 for inputting potential field gridded file;

a program generator 120 for refining potential field gridded file;

a program generator 130 for creating Surfer compatible file;

a program generator 140 for creating a smooth contour map; and a second interface 150 for printing and plotting contours.

In an embodiment of the present invention, the program includes means for implementing a smooth contouring and plotting system of geophysical data having less artifacts.

In another embodiment of the present invention, the inputting interface includes a means for inputting potential field gridded file generated by Minimum Curvature (MINC) of U.S GEOLOGICAL SURVEY (USGS) and MEGAPLUG programs are converted into ASCII format and used as inputs for the present system.

In yet another embodiment of the present invention, the program generator includes a means for converting the grids files of potential field grid system into surfer compatible form.

In still another embodiment of the present invention, the program generator a means to convert the output of Minimum Curvature into a Surfer compatible file.

In one more embodiment of the present invention, the program generator a means to generate smooth contours of geophysical data having less artifacts.

In one another embodiment of the present invention, the second interface a means is a printer or plotter having device drivers installed.

In a further embodiment of the present invention, the system is implemented on microcomputer systems, preferably personal microcomputers.

The present invention also provides a method for generating smooth contouring and plotting system of geographical data having less artifact, said method comprising the steps of:

(a) converting a gridded file generated by USGS package to an ASCII file;
(b) removing the header files from the aforesaid ASCII file to generate blanks;
(c) substituting the blanks developed in the ASCII file with values compatible to SURFER software, and
(d) incorporating the header of the SURFER.

The present invention further provides a method for generating smooth contouring and plotting system of geophysical data having less artifacts, using graphical flow based on surfer compatible minimum curvature program, said method comprising the following steps:
(a) inputting potential field gridded file;
(b) refining potential field gridded file;
(c) creating surfer compatible file; and
(d) automatically generating a smooth contour map without many artifacts;

In an embodiment of the present invention, said method converts the grids files of potential field grid system into surfer compatible form.

In another embodiment of the present invention, the output in the form of potential field gridded file generated by Minimum Curvature (MINC) of U.S GEOLOGICAL SURVEY (USGS) and MEGAPLUG programs are converted into ASCII format and used as inputs for the present system.

In yet another embodiment of the present invention, the potential field gridded file is converted into Surfer compatible format grid.

In still another embodiment of the present invention, the header values for the Surfer are generated.

In one more embodiment of the present invention, the header values are selected from minimum longitude, grid interval and minimum latitude.

In one another embodiment of the present invention, the plot thus generated is smooth without many artifacts.

In a further embodiment of the present invention, the contours generated have an unambiguous interpretation of geological and geophysical data.

In another embodiment of the present invention, the programs of Potential Field and Surfer are both used in conjunction on a digital computer.

In yet another embodiment of the present invention, the output is printed and plotted by means of a printer or plotter having device drivers installed.

If we generate the grids by surfer using the Minimum Curvature method and plot them, then we found that plots generated have lot of artifacts though quality of contour maps was far superior when compared to USGS generated plots. The grids generated by USGS package can not be used directly on surfer, hence in the present invention, the Inventors have developed a novel method (a subroutine MEGASURF) which converts the USGS generated grids into the Surfer format grids which on plotting, by using Surfer package, generates better maps with less artifacts. The subroutine is as follows:

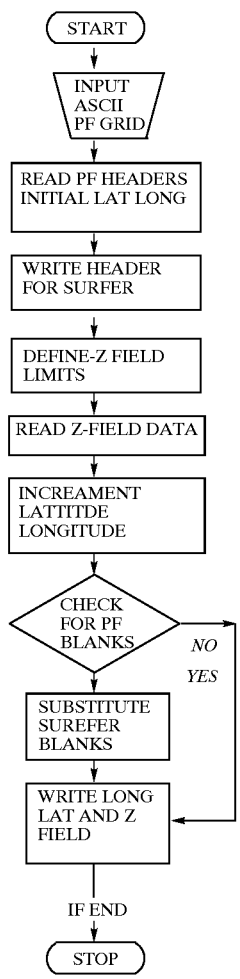

Description of the Subroutine Megasurf

At the starting of the program, the user is asked to input the ASCII and the PF Grid values. These values are obtained from the USGS package directly. The Initial Latitude and Longitude values are read and these are taken as PF header. A Surfer header corresponding to the PF header is then generated.

Then, the maximum and minimum values of Z data field are defined and the value of the Z data field is read. The Lattitude and the longitude values are then incremented by a value and a check for blanks in PF is conducted. If there is a blank in the PF header, the same is substituted with surfer balnks and the program proceeds to the step of writing down the values of the longitude, the latitude and the Z field. These data are printed and if the no more iterations are be carried out, the program stops.

Figure 1:
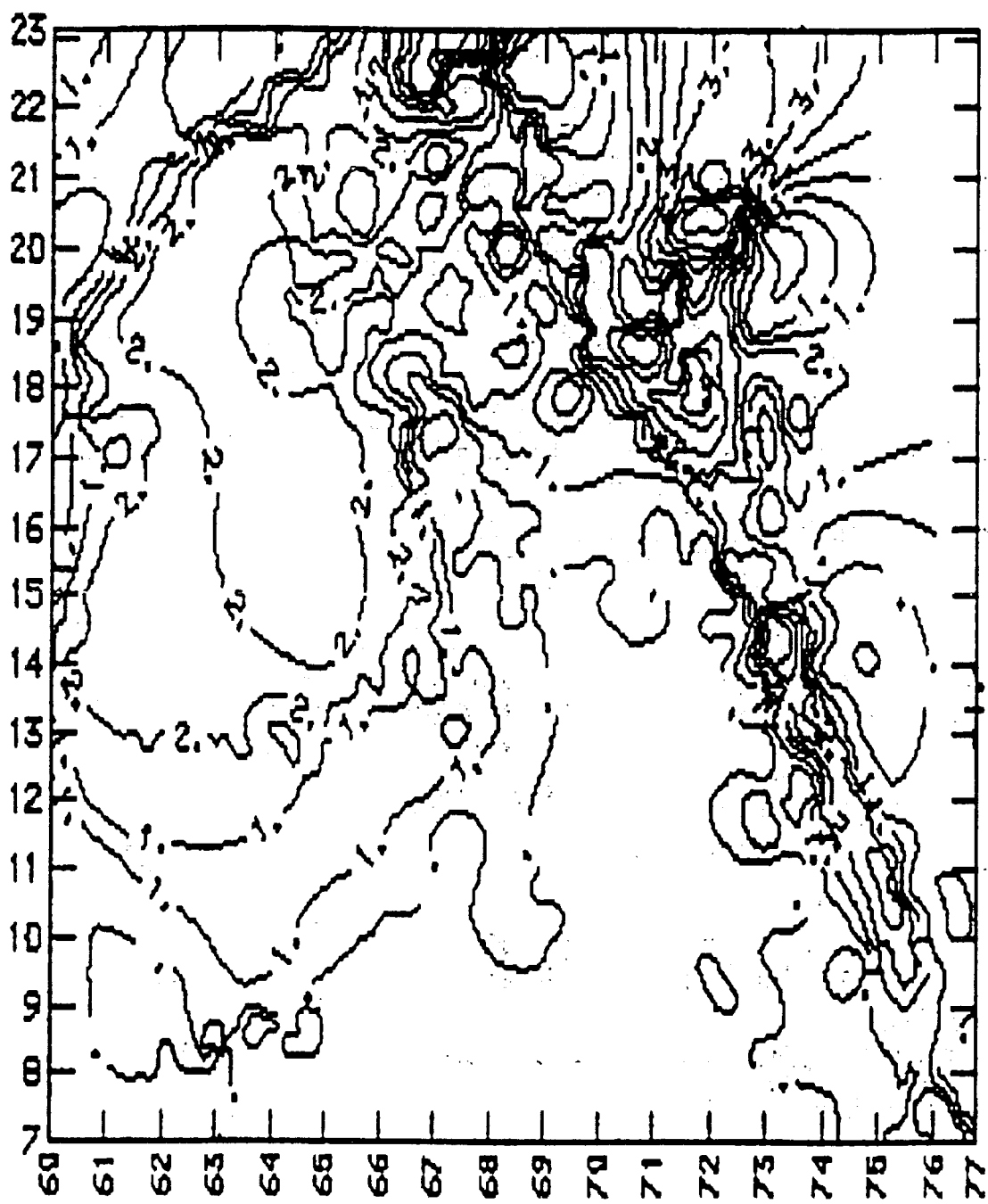
FIG. 1 represents contour map or geophysical data generated by minimum curvature method of PF package.

The Applicants have also studied the geophysical data set to evaluate the refinement in the contour sets the present procedure. The Inventors studied the contour map as generated in FIG. 1 which represents the data set by running the minimum curvature program of USGS package.

Figure 2:
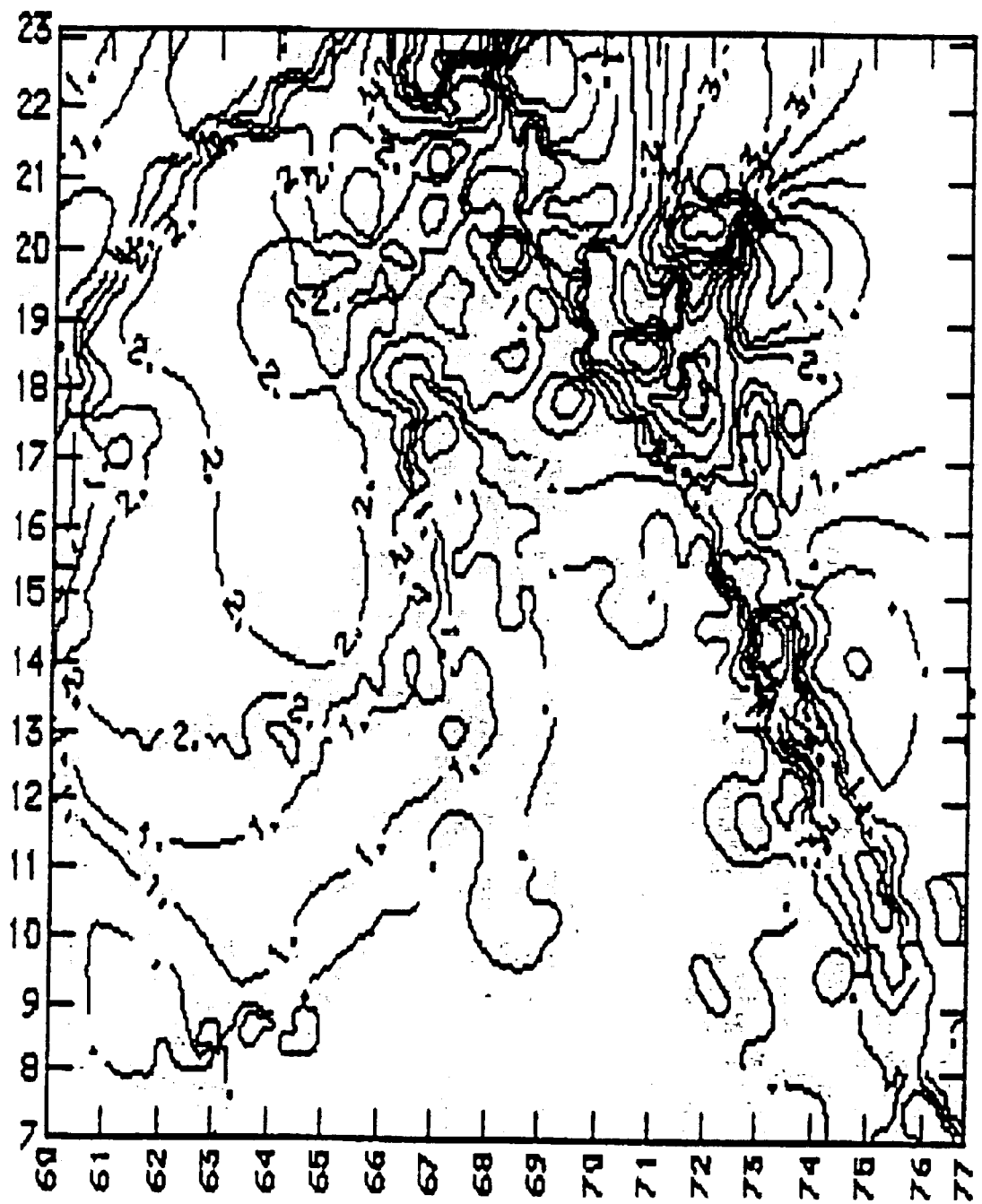
FIG. 2 represents contour map of above data with voids in the data filled with MEGAPLUG of PF package.

The contour map was once again taken after filling the blanks in the adjoining regions of the data points. The contour map thus obtained is shown in FIG. 2. The Inventors adopted the procedure prescribed in the routine MEGA-PLUG of USGS to fill up these blanks. It was noticed that there is little improvement in the second map as there are not many voids in the present data set. However, in both the first and the second contour maps the contours are not smooth as the maps are directly printed as the screen dumps on the printer.

Figure 3:
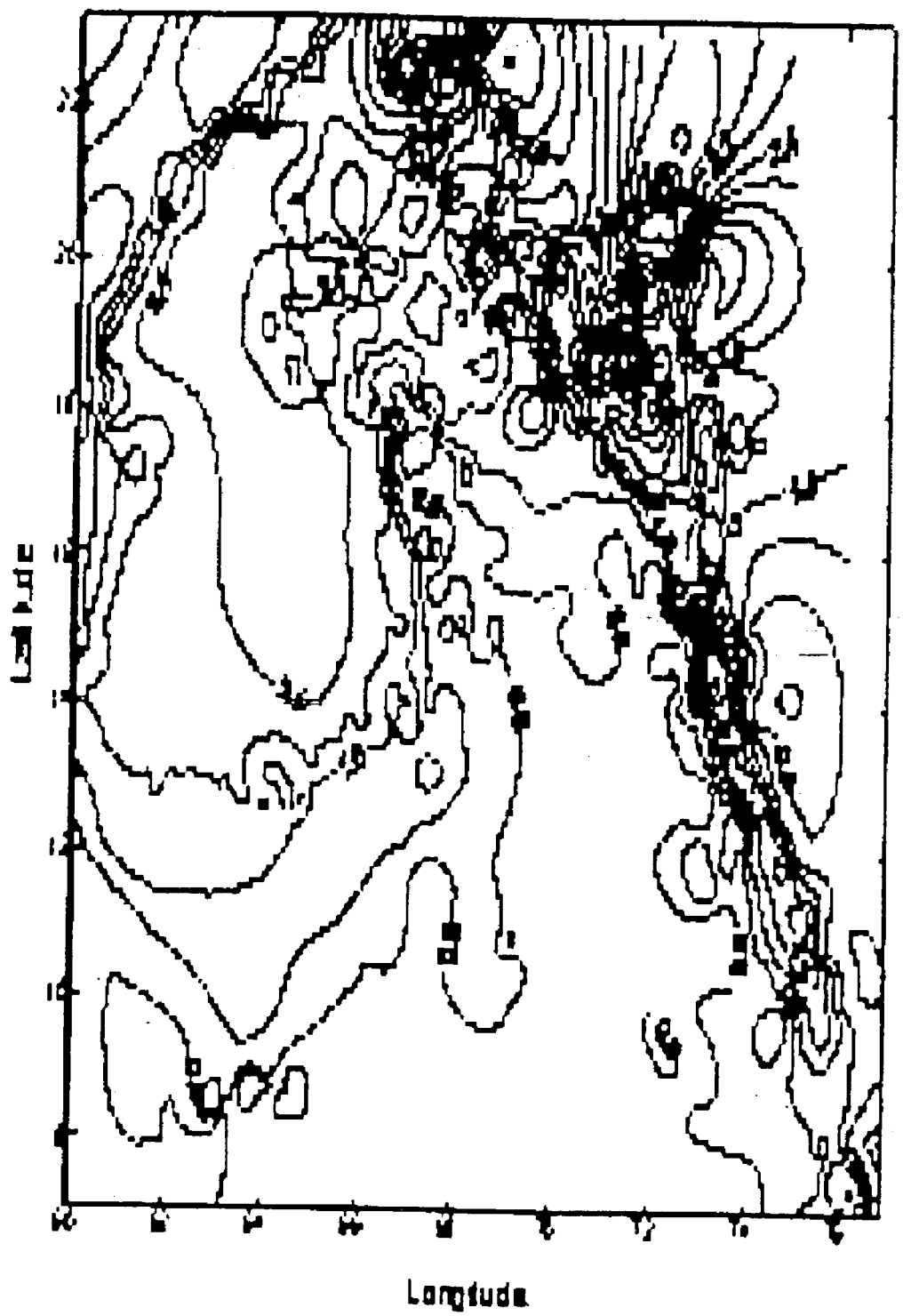
FIG. 3 represents the contour map of converted grid from PF (megaplugged) to Surfer.

Later the Inventors subjected the mega-plugged grid data to the refinement from the algorithm developed in the present scheme and the grid is converted to surfer compatible format. The Contour map was then plotted using the converted grid and the same is shown in FIG. 3. It was noticed that the contour are smooth and without any artifacts and can be printed/plotted on any printer/plotter where surfer software is installed.

Figure 4:
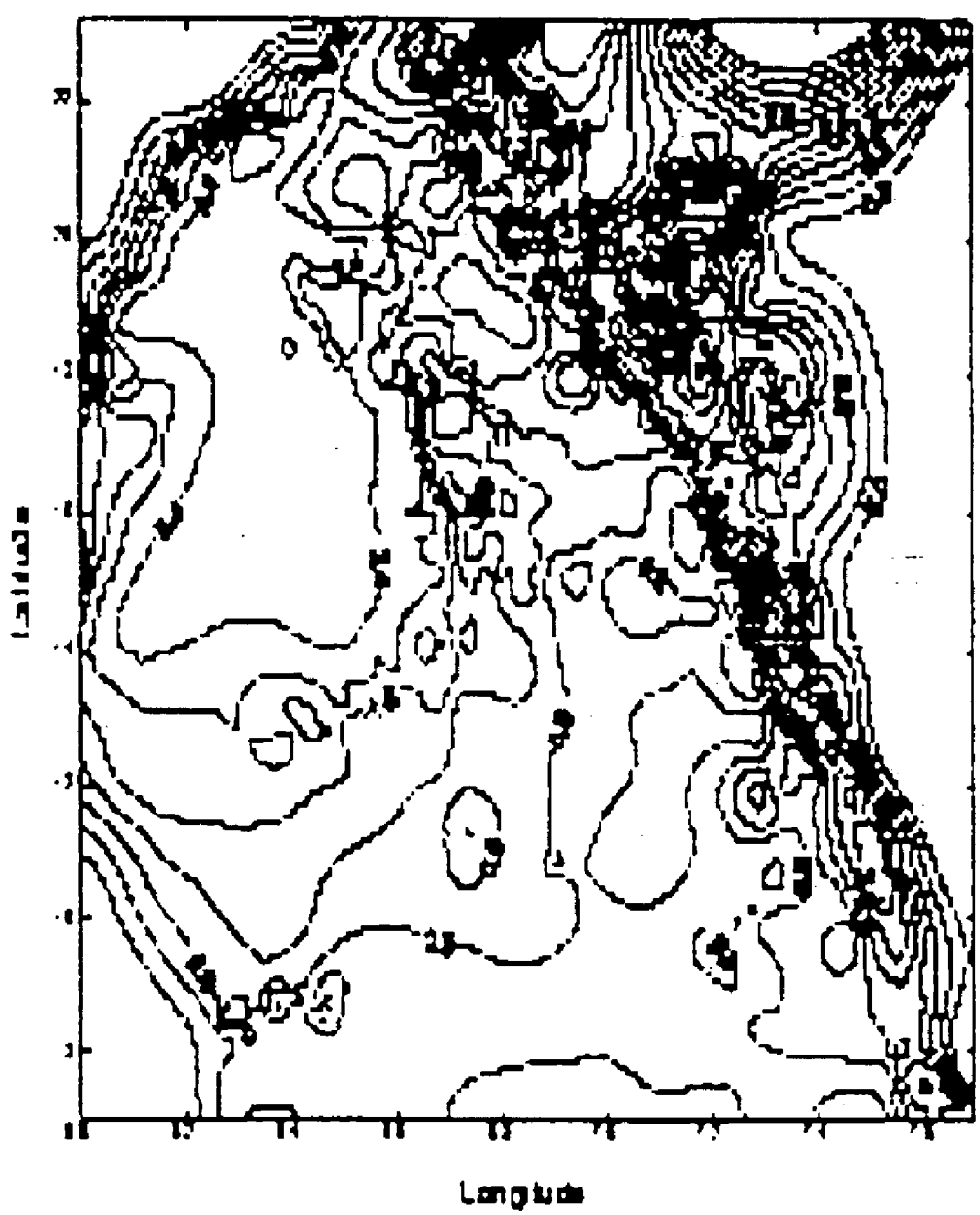
FIG. 4 represents the contour map of grid generated in Surfer package.

Finally, the Inventors plotted the contour map of surfer generated grid using the minimum curvature method available in the package and the same is shown in FIG. 4. It was noticed that the contours in this case in deed had artifacts. It was thus concluded that as the data contains voids and data is not well constrained over the entire region of study, the contours have artifacts and they extend in the areas beyond the limits of the data giving rise ambiguous interpretation.

The present invention is described with further reference to the Example which is given by way of illustration and hence, should not be construed to limit the scope of the present invention in any manner.

EXAMPLE 1

COMPUTER CODE

```
      PROGRAM MUSRF
C     THIS PROGRAM CONVERTS THE GRIDS FILES OF PF
C     PACKAGE MINC-MINIMUM-CURVATURE) TO SURFER
      PACKAGE
CC
      CHARACTER*12 NAME1
      CHARACTER*12 NAME2
      CHARACTER*65 CH
      REAL Z(200,200)
      INTEGER ROW,COL
CC
      PRINT*,' '
C     THE OUTPUT OF MINC, MEGAPLUGGED AND
C     CONVERTED TO ASCII FORMAT USING THE SF2ASCII
C     PROCEDURE AVAILABLE IN PF PACKAGE IS THE INPUT
C     FOR THE PRESENT SOFTWARE.
CC
      PRINT*,' GIVE NAME OF THE FILE TO OPEN'
      READ(*,11)NAME1
      OPEN(6,FILE=NAME1)
CC
C     THE GRIDDED FILE TO BE GENERATED BY THE PRESENT
C     SOFTWARE SHOULD BE NAMED WITH EXTENTION GRD.
CC
      PRINT*,' GIVE THE NAME OF THE OUTPUT FILE'
CC
      READ(*,11)NAME2
  11  FORMAT(A12)
      OPEN(7,FILE=NAME2)
      READ(6,13)CH,ICOL,IROW
CC
C     II IS THE DUMMY VALUE AND CH1,CH2,CH3,CH4 ARE
C     THE HEDEAR VALUES INDICATING THE MINIMUM
C     LONGITUDE AND ITS GRID INTERVAL,MINIMUM
C     LATITUDE AND ITS C GRID INTERVAL
CC
      READ(6,15)II,CH1,CH2,CH3,CH4
      WRITE(*,*)'READING STARTED'
```

-continued

COMPUTER CODE

```
      ZMIN=0.0
      ZMAX=5.0
  13  FORMAT(A65,2I8)
  15  FORMAT(I2,4G18.0)
      WRITE(*,17)ICOL,IROW,CH1,CH3,CH2
  17  FORMAT(2I4,3F10.3)
      ROW=IROW
      COL=ICOL
      ALON1=CH1
      XX=ALON1
      DO 21 K=1,COL
      XX=XX+CH2
  21  CONTINUE
      ALON2=XX
      ALAT1=CH3
      YY=ALAT1
      DO 22 KK=1,ROW
  22  YY=YY+CH2
      ALAT2=YY
      DO 23 I = 1,ROW
      READ(6,*) (Z(I,J),J=1,COL)
  23  CONTINUE
CC
C     HEADER FOR THE SURFER FILE BEING GENERATED.
CC
      WRITE(7,19)
  19  FORMAT('DSAA')
      WRITE(7,20)COL,ROW
  20  FORMAT(I3,1X,I3)
      WRITE(7,25)ALON1,ALON2
      WRITE(7,25)ALAT1,ALAT2
  25  FORMAT(2(F5.2,1X))
CC
C     THE MINIMUM AND THE MAXIMUM FIELD VALUES TO
C     CHANGED IN THE PROGRAM AFTER GETTING FROM
C     XYZMAX FROM A PROGRAM.
CC
      WRITE(7,27)ZMIN,ZMAX
  27  FORMAT(F5.1,1X,F5.1)
      DO 31 I=1,ROW
      DO 32 J=1,COL
      IF(Z(I,J).EQ.0.1701412E+39) GO TO 101
      GO TO 32
 101  Z(I,J)=1.70141E+38
  32  CONTINUE
  31  CONTINUE
      DO 33 I=1,ROW
      WRITE(7,*) (Z(I,J),J=1,COL)
  33  CONTINUE
      STOP
      END
```

The aforesaid program has been specifically designed by the Inventors in order to perform the method of the present invention. Its should however be noted that a large number of minute modifications to the program would be obvious to a person of ordinary skill in the art without actually affecting the basic structure and/or the working of the program. Therefore the present invention should not be restricted to the above given program alone.

What is claimed is:

1. A digital computer implemented software system using graphical flow language for an improved method for smooth contouring and plotting system of geophysical data having less artifacts, based on Surfer compatible minimum curvature program, the system comprising:

a first interface for inputting potential field gridded file, wherein the first interface includes a means for inputting potential field gridded file generated by Minimum Curvature (MINC) of U.S. GEOLOGICAL SURVEY (USGS) and MEGAPLUG programs, the gridded file being converted into ASCII format and used as inputs for the present system;

a program generator for refining potential field gridded file;

a program generator for creating a Surfer compatible file;

a program generator for creating a smooth contour map; and a second interface for printing and plotting contours.

2. The system of claim 1, wherein the program generator includes means for implementing a smooth contouring and plotting system of geophysical data having less artifacts.

3. The system of claim 1, wherein the program generator include a means for converting the grids files of potential field grid system into Surfer compatible form.

4. The system of claim 1, wherein the program generator includes a means to convert an output of Minimum Curvature into a Surfer compatible file.

5. The system of claim 1, wherein the program generator includes a means to generate smooth contours of geophysical data having less artifacts.

6. The system of claim 1, wherein the second interface includes a means as a printer or plotter having device drivers installed.

7. The system of claim 1, wherein the system is implemented on microcomputer systems, preferably personal microcomputers.

8. A method for generating smooth contouring and plotting system of geographical data having less artifact, said method comprising the steps of:

(a) converting a gridded file generated by U.S. GEOLOGICAL SURVEY (USGS) package to an ASCII file;

(b) removing the header files from the aforesaid ASCII file to generate blanks;

(c) substituting the blanks developed in the ASCII file with values compatible to SURFER software, and (d) incorporating the header of the SURFER.

9. A method according to claim 8, wherein programs of Potential Field and Surfer are both used in conjunction on a digital computer.

10. A method as claimed in claim 8, wherein the gridded file generated by USGS package is in the form of potential field gridded file.

11. A method for generating smooth contouring and plotting system of geophysical data having less artifacts, using graphical flow based on surfer compatible minimum curvature program, said method comprising the following steps:

(a) inputting potential field gridded file, wherein the output in the form of potential field gridded file generated by Minimum curvature (MINC) of U.S. GEOLOGICAL SURVEY (USGS) and MEGAPLUG programs, the gridded file being converted into ASCII format and used as inputs for the present system;

(b) refining potential field gridded file;

(c) creating a Surfer compatible file; and (d) automatically generating a smooth contour map without many artifacts.

12. A method according to claim 11, wherein said method converts the grids files of potential field grid system into a Surfer compatible form.

13. A method according to claim 11, wherein the potential field gridded file is converted into Surfer compatible format grid.

14. A method according to claim 11, wherein header values for the Surfer are generated.

15. A method according to claim 11, wherein header values are selected from minimum longitude, grid interval and minimum latitude.

16. A method according to claim 11, wherein the plot thus generated is smooth without many artifacts.

17. A method according to claim 11, wherein the contours generated have an unambiguous interpretation of geological and geophysical data.

18. A method according to claim 11, wherein the output is printed and plotted by means of a printer or plotter having device drivers installed.

* * * * *